(12) United States Patent
Langenfeld (10) Patent No.: US 8,931,268 B1
(45) Date of Patent: Jan. 13, 2015

(54) TRANSAXLE FLUID EXPANSION AND CONTRACTION ACCOMMODATION APPARATUS

(75) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 585 days.

(21) Appl. No.: 13/336,214

(22) Filed: Dec. 23, 2011

Related U.S. Application Data (60) Provisional application No. 61/426,944, filed on Dec. 23, 2010.

(51) Int. Cl.
*F16D 31/02* (2006.01)
*F16D 39/00* (2006.01)

(52) U.S. Cl.
USPC ............................................. 60/485; 60/487

(58) Field of Classification Search
USPC ........................................ 60/485, 487, 488
See application file for complete search history.

(56) References Cited

U.S. PATENT DOCUMENTS

| | | | |
|---|---|---|---|
| 2,195,877 A | 4/1940 | Steedman | |
| 3,087,734 A | 4/1963 | Klingler | |
| 4,791,824 A | 12/1988 | Nicolau | |
| 4,987,796 A * | 1/1991 | von Kaler et al. | 74/606 R |
| 5,236,061 A | 8/1993 | Haupt | |
| 5,314,387 A | 5/1994 | Hauser et al. | |
| 6,185,936 B1 | 2/2001 | Hauser et al. | |
| 6,354,975 B1 | 3/2002 | Thoma | |
| 6,843,747 B1 | 1/2005 | Phanco et al. | |
| 7,210,294 B1 | 5/2007 | Langenfeld | |
| 7,926,266 B1 | 4/2011 | Wigness et al. | |
| 7,926,624 B1 | 4/2011 | Taylor | |

* cited by examiner

*Primary Examiner* — Edward Look
*Assistant Examiner* — Daniel Collins
(74) *Attorney, Agent, or Firm* — Neal, Gerber & Eisenberg LLP (57) ABSTRACT

An apparatus for accommodating fluid expansion and contraction within an axle housing or axle support structure of a hydrostatic transaxle is provided. A partitioning element separates the hydraulic fluid from an air chamber created at least partially by the partitioning element and the partitioning element extends around a portion of the axle and at least a portion of the partitioning element is movable along the longitudinal axis of the axle to expand the volume of the sump.

23 Claims, 11 Drawing Sheets

TRANSAXLE FLUID EXPANSION AND CONTRACTION ACCOMMODATION APPARATUS

This application claims the benefit of U.S. Provisional Application No. 61/426,944 filed on Dec. 23, 2010, which is incorporated by reference in its entirety.

BACKGROUND OF THE INVENTION

This application relates to a device for driving an axle and, in particular, to hydrostatic transaxles intended for use in vehicles and similar applications.

Hydrostatic transaxles generally comprise a transmission disposed in a sump and driving an output axle or axles. Such transaxles often include a sump vent in communication with atmosphere or have an added external fluid expansion tank or reservoir to accommodate sump fluid expansion and contraction within a broad range of operating conditions and temperatures. An external fluid expansion tank or reservoir can be damaged by impact and weathering and may develop leaks in associated hoses, tubes, fittings, connections and the like. A sump vent may leak sump fluid during handling, installation or under certain transaxle operating conditions and may allow entry of moisture or other contaminants into the sump fluid which can cause damage to mechanical components running inside the transaxle housing. External components require additional space and material and limit vehicle configuration versatility. An internal bellows may be used but such known designs require sufficient space within the transaxle housing and increase the required size of the housing. For the foregoing reasons, there is a need for a fluid expansion means and a sealed sump fully contained within a transaxle case or housing which efficiently and cost-effectively utilize space and material.

SUMMARY OF THE INVENTION

An apparatus for accommodating fluid expansion and contraction within a transaxle case or housing, particularly within an axle support structure that is already normally substantially present as an element or component of the transaxle case or housing, which efficiently utilizes space and material and enables a reduction in the amount of hydraulic fluid present in a sump sealed from atmosphere and fully contained within the transaxle case or housing, is disclosed herein. Also disclosed are biasing features that can be used to pressurize the sump oil or sump fluid in a transaxle that will be operated in a cold environment so that transaxle case oil pressure does not drop below atmospheric pressure, which condition can be damaging to certain transaxle internal running surfaces during cold start-up and cold running.

DETAILED DESCRIPTION OF THE INVENTION

Figure 1:
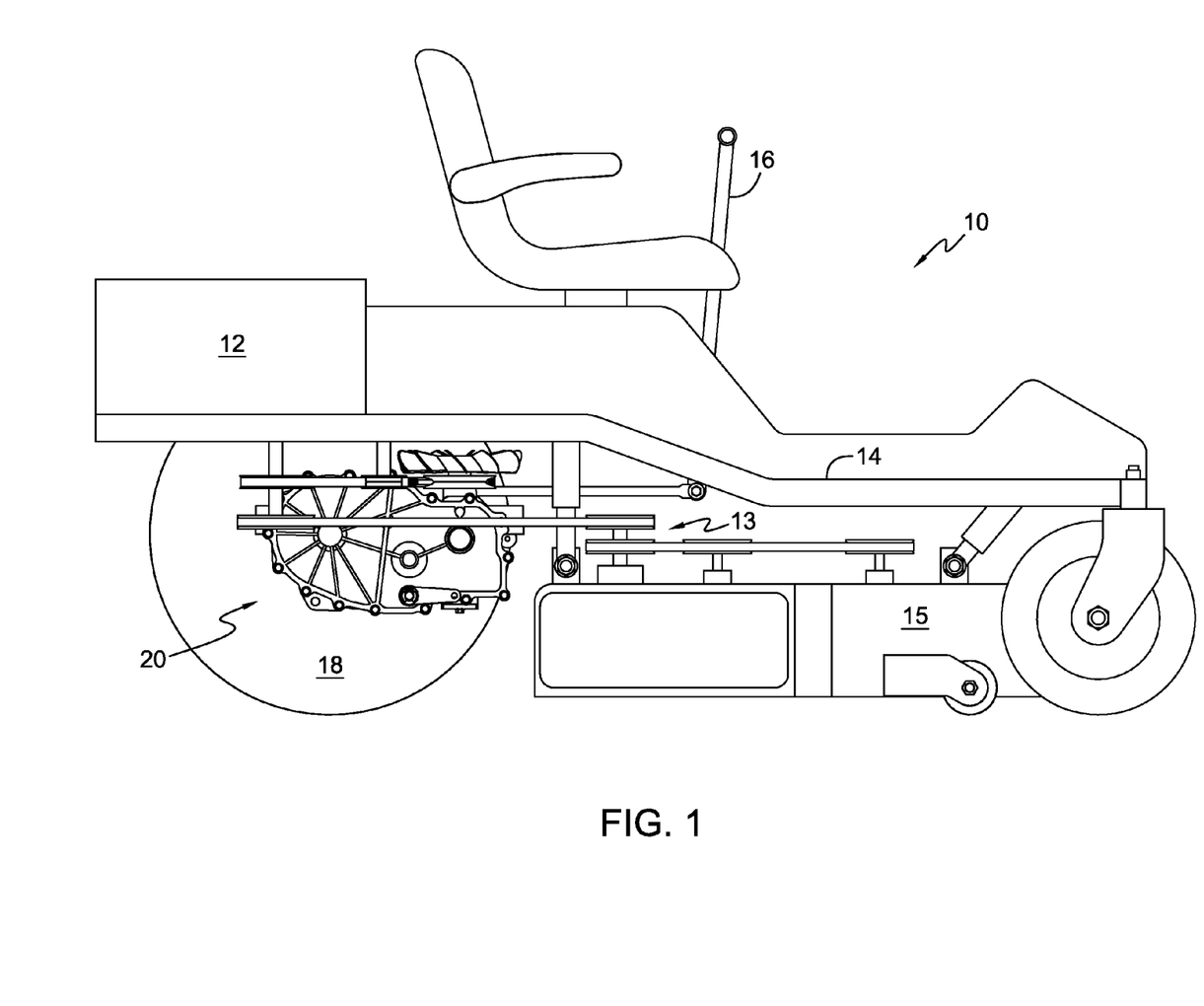
FIG. 1 is a side elevational view of an exemplary vehicle in accordance with the subject invention with one driven wheel and one wheel-driving apparatus or transaxle removed for clarity.

This invention is described herein with respect to exemplary vehicle 10, which is shown in FIG. 1 with one driven wheel and one wheel-driving unit or transaxle removed for clarity. It will be understood that other vehicles and applications can be used in accordance with the present invention.

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in instances where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

In general, exemplary vehicle 10 includes a prime mover or engine 12 powering a pair of transaxles 20 mounted on frame 14, each separately driving a wheel 18. Such vehicles generally include an engine-driven apparatus such as mower deck 15, which may be connected to engine 12 through a belt and pulley assembly 13. In the exemplary vehicle configuration, two user controls 16 are mounted in vehicle 10 and connected to respective transaxle 20 to independently control the output speed and direction of each transaxle 20 to enable zero turn radius capability of vehicle 10. Only one of the transaxles 20 and one of vehicle controls 16 are depicted in FIG. 1 for clarity. It will be understood that there will be additional linkages and the like that are not depicted herein for the sake of simplicity, such as engine controls and brake linkages. Additionally, methods of controlling transaxles 20 other than that depicted are known and may be used in connection with the invention disclosed herein.

Figure 2:
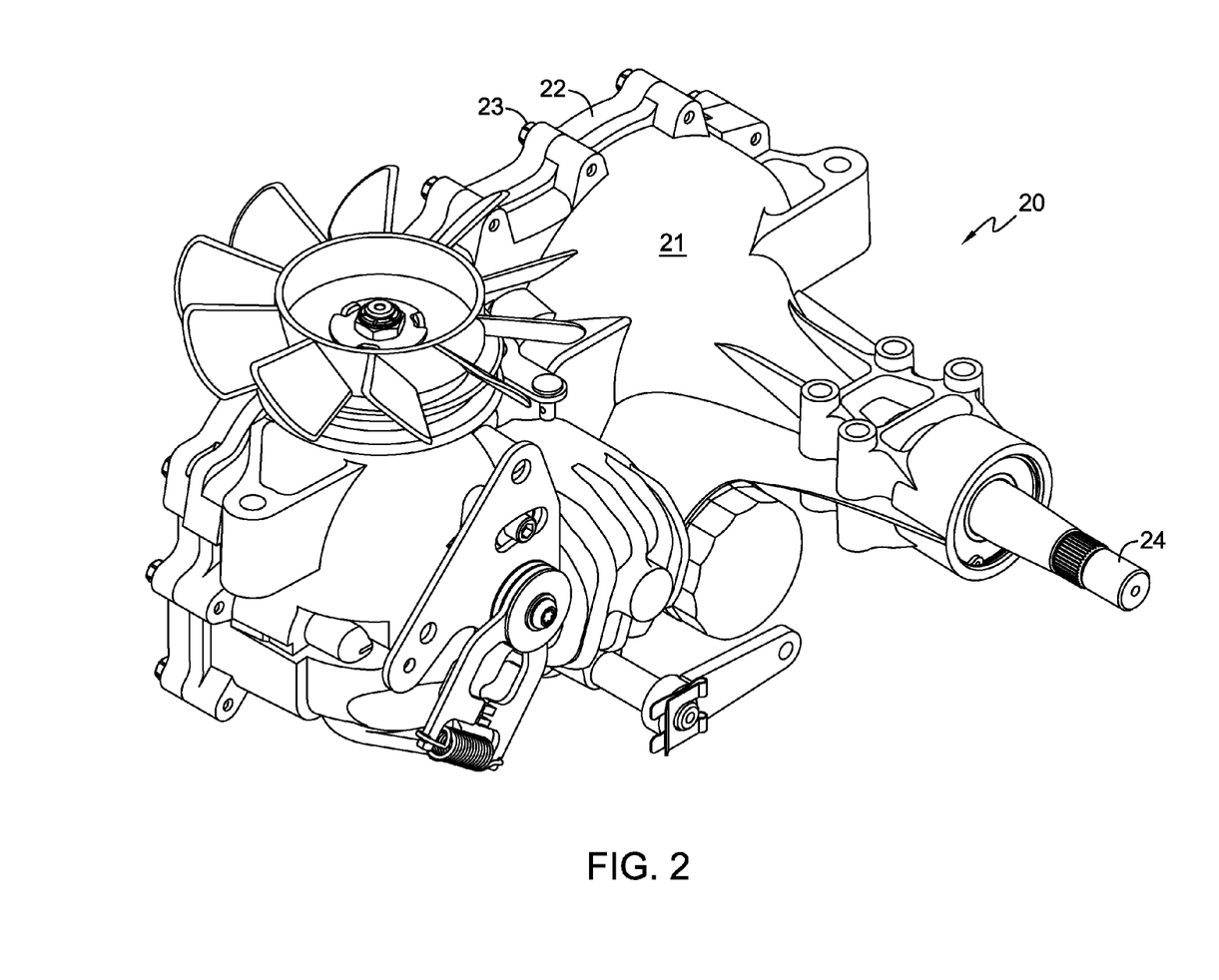
FIG. 2 is a perspective view of an exemplary hydrostatic transaxle in accordance with the subject invention.
Figure 3:
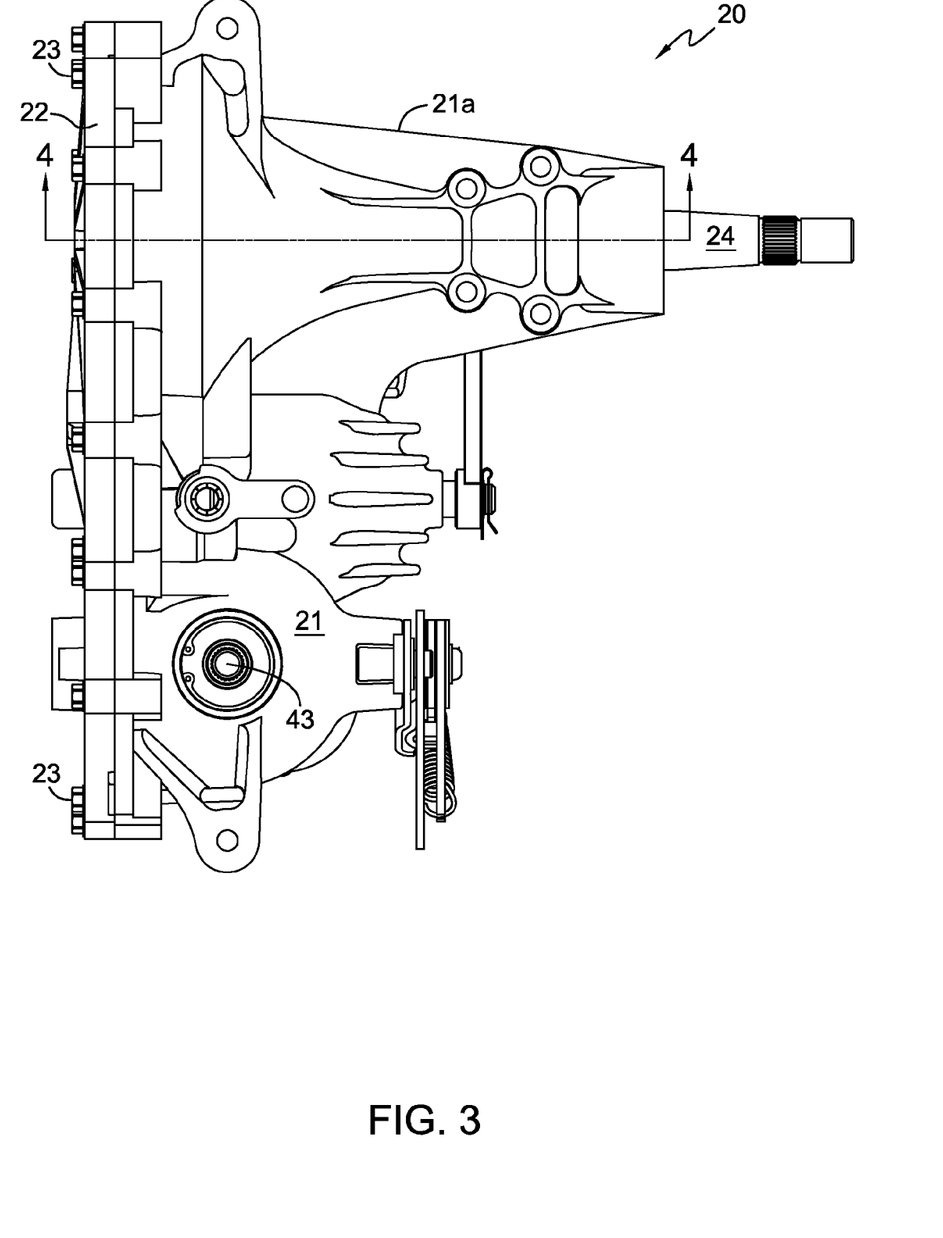
FIG. 3 is a top plan view of the transaxle shown in FIG. 2.
Figure 4:
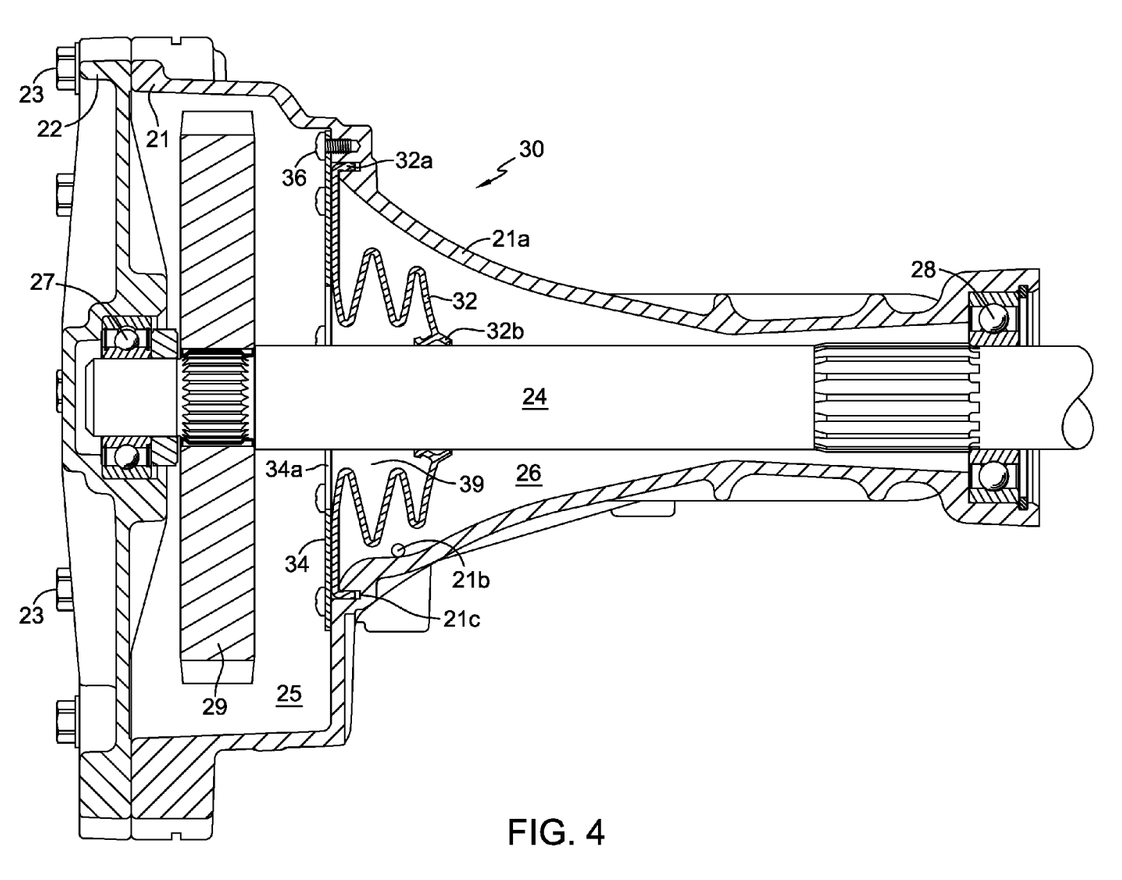
FIG. 4 is a cross-sectional view of the transaxle of FIG. 2, along the line 4-4 in FIG. 3, depicting a first embodiment of the present invention.
Figure 10:
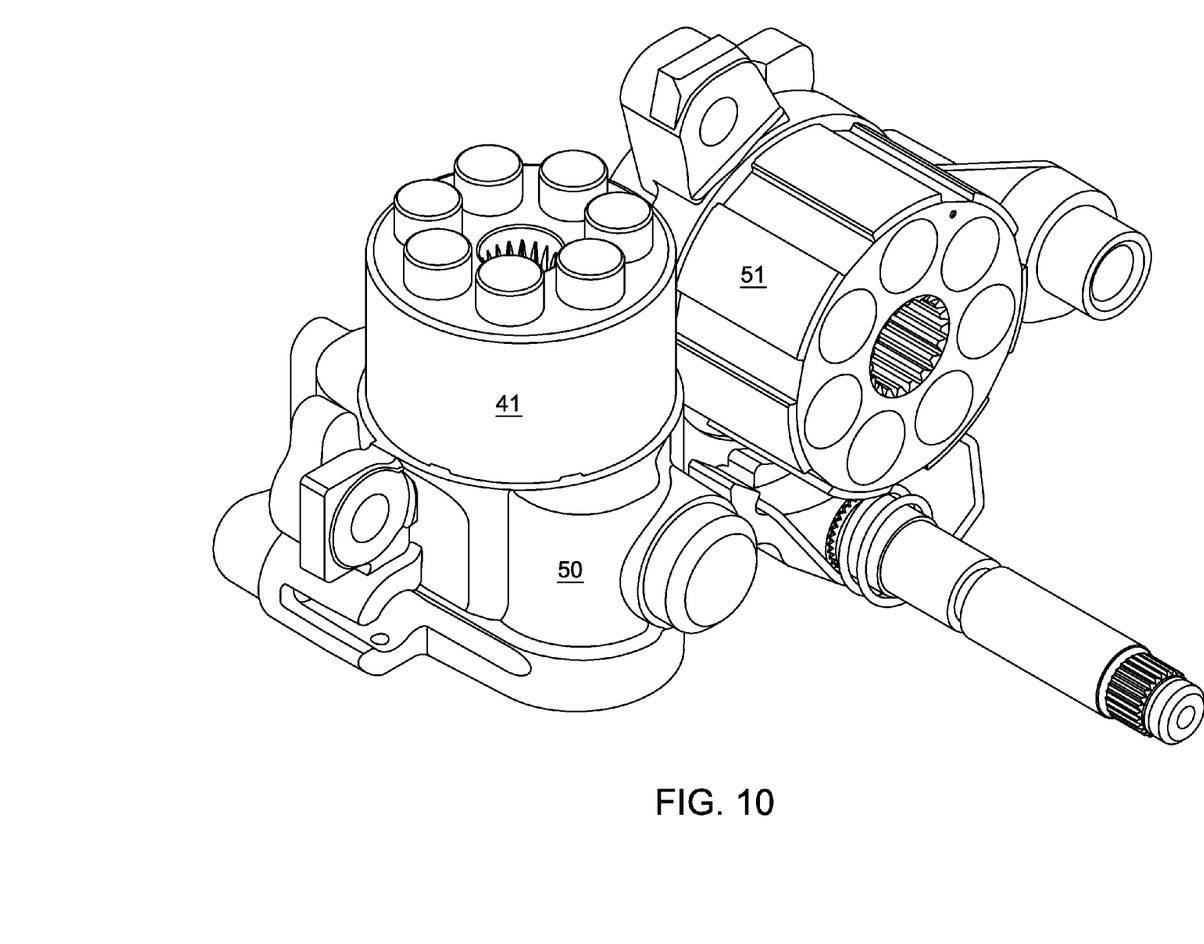
FIG. 10 is a perspective view of certain components of an exemplary hydrostatic transmission.
Figure 11:
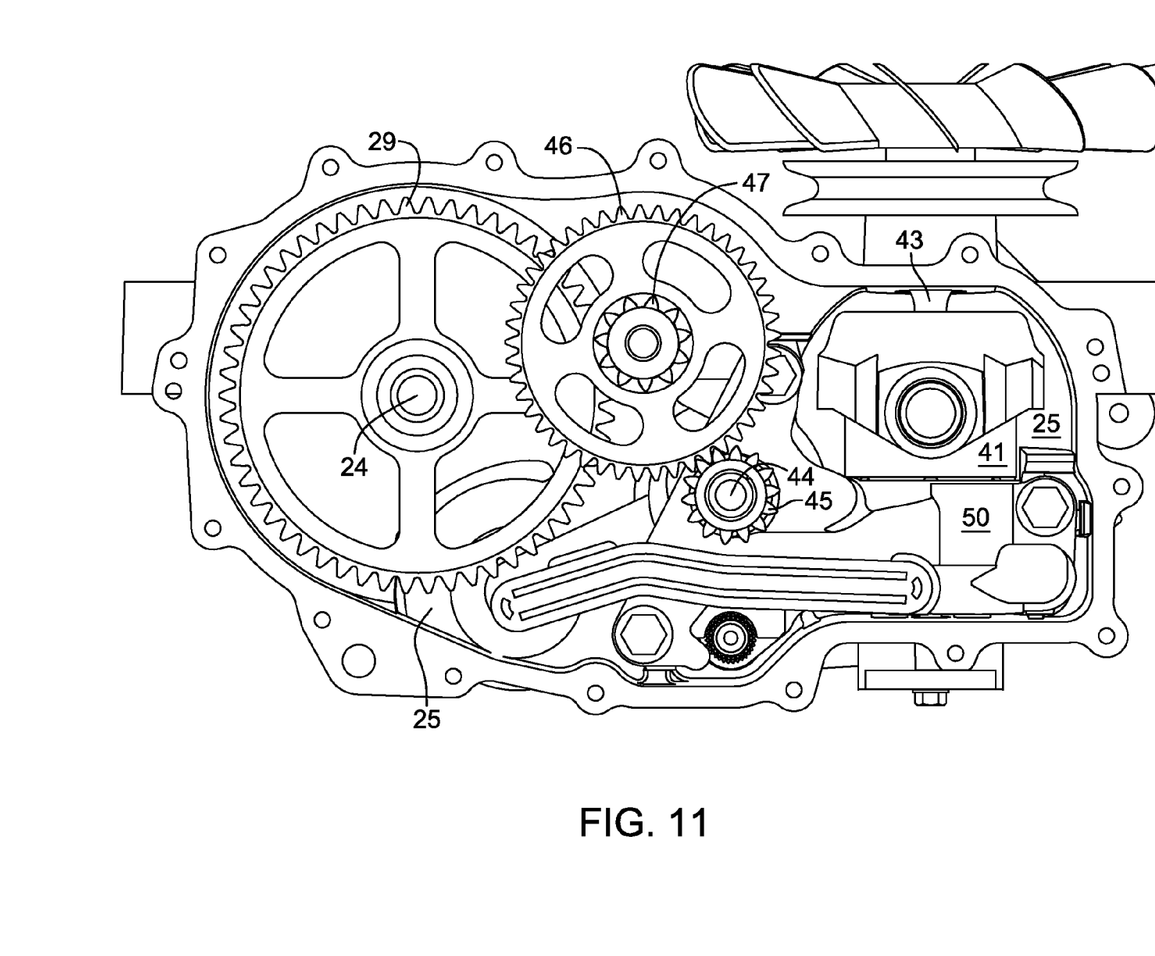
FIG. 11 is a side elevational view of an exemplary transaxle with the side housing removed to show the hydrostatic and gearing components.

Transaxle 20 is shown in more detail in FIGS. 2-4. A main housing 21 is joined by a plurality of fasteners 23 and joint sealant (not shown) or by other known means to side housing 22 along a split line generally perpendicular to output axle 24 to form a case comprising an oil sump 25, which is partitioned so that an air chamber 26 is created by the partitioning means in conjunction with a portion of the housing structure or axle support structure surrounding and supporting axle 24, and a sealed bearing 228. In a typical zero turn vehicle arrangement, two such transaxles 20 are used, as previously mentioned herein, and each may be a mirror image of the other. Hydrostatic transaxles are well-known in the art, and the internal functioning of the various components, such as the pump, motor, hydraulic porting and the like are described, for example, in U.S. Pat. Nos. 5,314,387; 6,185,936; 7,926,624; and 7,926,266, all of which are commonly owned with this application and all of which are incorporated herein by reference. Certain components of an exemplary hydrostatic drive are depicted in FIG. 10, where pump cylinder block 41 and motor cylinder block 51 are disposed on a center section 50. As shown in FIGS. 10 and 11, pump input shaft 43 drives pump cylinder block 41 and motor cylinder block 51 drives motor shaft 44, which is engaged to a gear mechanism composed of gears 45, 46 and 47 to drive main gear 29 and axle 24. Such units are disclosed in the aforementioned U.S. Pat. Nos. 7,926,266 and 7,926,624 and the reader is referred to those patents for additional details on the structure and operation of such hydraulic components. Alternatively, in a typical IHT arrangement, such an that shown in U.S. Pat. Nos. 5,314,387 and 6,185,936, a single transaxle unit includes two axles and housing structure surrounding and supporting the two axles in a manner that also allows application of the present invention to that type of transaxle unit. Furthermore, the invention may be applied in conjunction with the axle support structure associated with just one or with both of the two axles in a typical IHT arrangement, as needed.

The particular shape of the housing is not critical, but transaxle housings generally have an axle horn such as axle horn 21a or a separate area within the main housing to accommodate the axle. The use of the expansion accommodation device in a manner such that at least a portion of it moves along the axle allows for a more compact unit. In the embodiments depicted, axle horn 21a is integrally formed as part of the main housing but separate axle horns that bolt to a main housing are known. The size and shape of axle horns 21a, 121a, 221a, etc. can be varied depending on application requirements.

Referring now to FIG. 4, a first embodiment of the present invention is illustrated. Axle shaft 24 is supposed near a proximal end by a bearing 27 mounted in side housing 22 and is supported nearer to its distal end by the sealed bearing 28 mounted in main housing 21. Gear 29 is splined or otherwise rotatably fixed to and drives axle 24, which has its distal end engaged to and driving a wheel 18. A fluid volume expansion and contraction accommodation apparatus in the form of a bellows assembly 30 includes a bellows member 32 that serves as a flexible partition separating sump 25 from air chamber 26 formed by the installation of bellows assembly 30 in axle horn 21a of main housing 21. Bellows member 32 forms a dynamic, expandable internal volume 39. Sump 25 is sealed from air chamber 26 by static seals 32a and dynamic seals 32b that are integrally formed on bellows member 32, as shown, or otherwise attached or affixed thereto. Static seal 32a is similar to an o-ring and is pushed into groove 21c formed in main housing 21 while dynamic seal 32b seals against axle 24. Dynamic seal 32b moves axially in each direction along axle 24 as bellows member 32 is expanded and contracted due to temperature changes and resultant volume changes of the oil in sump 25.

It will be understood that the expansion bellows members 32 disclosed herein are generally annular in shape. As shown in FIG. 4, the inner diameter of the annulus is adjacent to the outer circumference of the axle 24, and the outer diameter is engaged in the housing. The shape of the outer diameter of the annulus may not necessarily be circular but will be shaped to fit the housing to accommodate placement of static seal 32a in groove 21c. The other embodiments of the bellows disclosed herein may be similar in this respect. Bellows member 32 may be retained by a retention plate or member 34 that is secured to main housing 21 by a plurality of screws 36 or other suitable joining means, such as rivets, for example. Retention member 34 also prevents any damaging contact between bellows member 32 and any moving parts, such as gear 29. Retention member 34 includes an oil flow opening 34a to allow oil to move freely in and out of the dynamic internal volume 39 of the flexible bellows member 32 as the oil volume in sump 25 expands and contracts. A drain opening 21b in communication with air chamber 26 is provided through an outer wall of main housing 21 to allow fluid drainage, partially relieve case pressure, and to detect failure or excessive seal leakage of bellows assembly 30.

Figure 5:
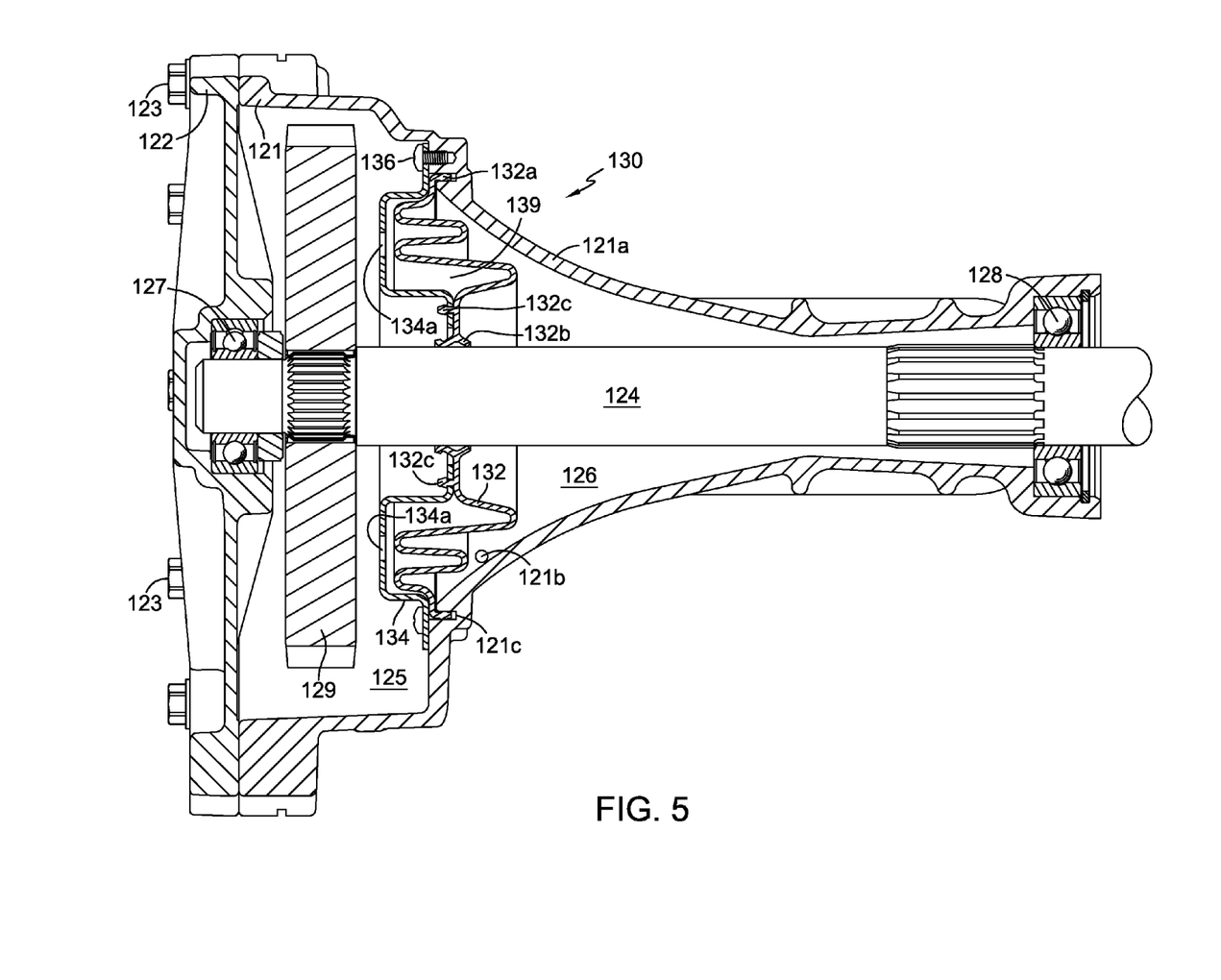
FIG. 5 is a cross-sectional view of a transaxle, similar to that shown in FIG. 2, depicting a second embodiment of the present invention.

Referring now to FIG. 5, a second embodiment of the present invention is illustrated. Similar to the prior embodiment, a main housing 121 is joined by a plurality of fasteners 123 and joint sealant (not shown) or by other known means to side housing 122 along a split line generally perpendicular to output axle 124 to form a case comprising an oil sump 125, which is partitioned so that an air chamber 126 is created by the partitioning means in conjunction with a portion of the housing structure surrounding and supporting axle 124, and a sealed bearing 128. Axle shaft 124 is supported near its proximal end by a bearing 127 mounted in side housing 122 and is supported nearer to its distal end by the sealed bearing 128 mounted in main housing 121. Gear 129 is splined or otherwise rotatably fixed to and drives axle 124.

A fluid volume expansion and contraction accommodation apparatus in the form of a bellows assembly 130 includes a bellows member 132 having a dynamic, expandable internal volume 139 and serving as a flexible partition separating sump 125 from air chamber 126 formed by the installation of bellows assembly 130 in axle horn 121a of main housing 121. Sump 125 is sealed from air chamber 126 by seals 132a and 132b that are integrally formed on bellows member 132, as shown, or otherwise attached or affixed thereto. Seal 132a is similar in form to an o-ring and is pushed into groove 121c formed in main housing 121 while seal 132b seals against axle 124. In this embodiment, seal 132b does not move axially along axle 124 as bellows member 132 is expanded and contracted due to temperature changes and resultant volume changes of the oil in sump 125. Rather, bellows member 132 is anchored to a retention plate or member 134 by a plurality of projections 132c integrally formed on bellows member 132, as shown, or by other known attachment means, in order to prevent any substantial axial movement of seal 132b.

Bellows member 132 is retained by the retention member 134 that is secured to main housing 121 by a plurality of screws 136 or other suitable joining means, such as rivets, for example. Retention member 134 includes one or more oil flow openings 134a to allow oil to move freely in and out of the dynamic volume 139 located between retention member 134 and the interior surfaces of flexible bellows member 132 in contact with the oil in sump 125 as the oil volume in sump 125 expands and contracts. Retention member 134 also shields bellows member 132 from possibly damaging contact between bellows member 132 and any moving parts, such as gear 129. As before, a drain opening 121b in communication with air chamber 126 is provided through an outer wall of main housing 121 to allow fluid drainage, partially relieve case pressure, and to detect failure or excessive seal leakage of bellows assembly 130.

Figure 6:
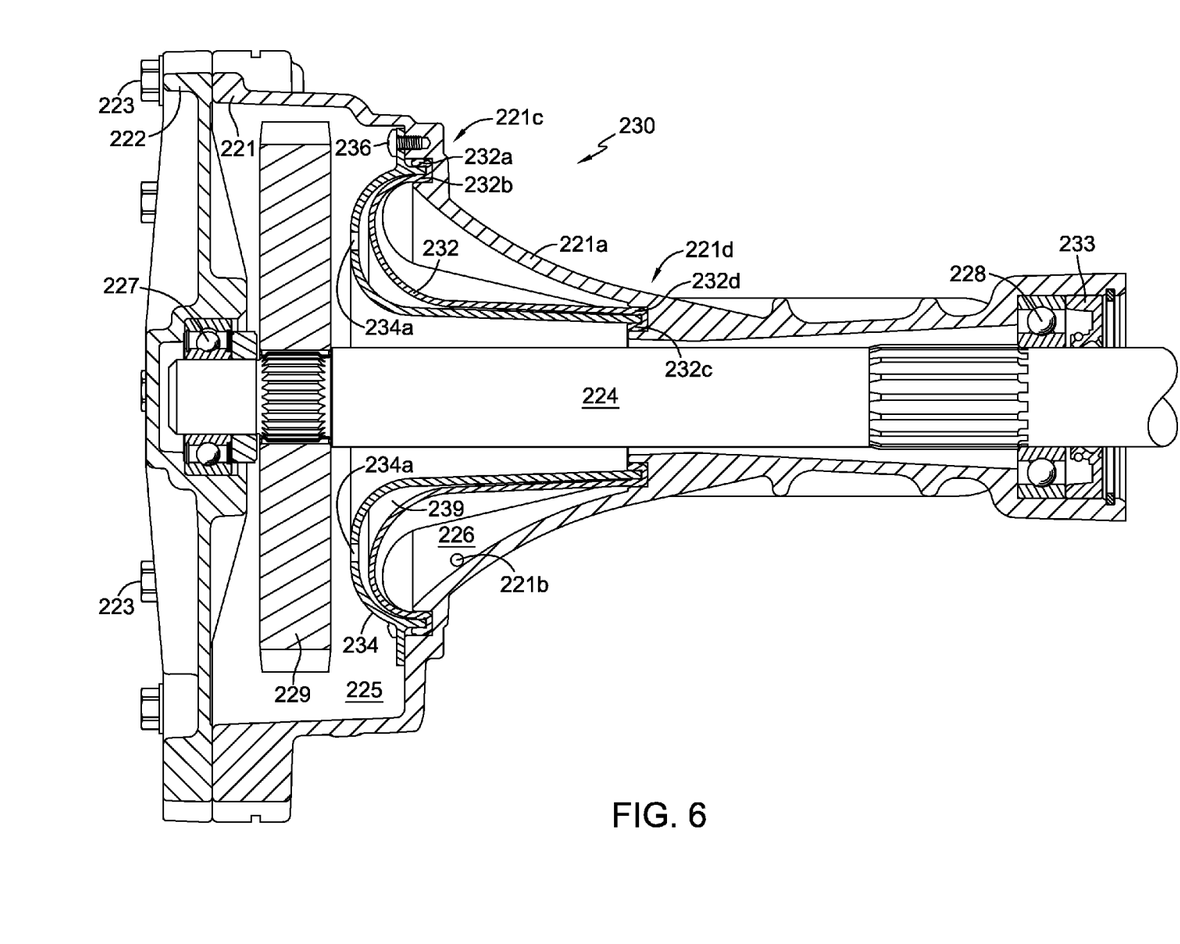
FIG. 6 is a cross-sectional view of a transaxle, similar to that shown in FIG. 2, depicting a third embodiment of the present invention.

A third embodiment of the present invention is illustrated in FIG. 6. Similar to the earlier embodiments, a main housing 221 is joined by a plurality of fasteners 223 and joint sealant (not shown) or by other known means to side housing 222 along a split line generally perpendicular to output axle 224 to form a case comprising an oil sump 225. Axle shaft 224 is supported near one end by a bearing 227 mounted in side housing 222 and is supported nearer to its other end by a bearing 228 mounted in main housing 221. Gear 229 is splined or otherwise rotatably fixed to and drives axle 224. Bellows assembly 230 includes a bellows member 232 having a dynamic expandable internal volume 239 and serving as a flexible partition separating sump 225 from air chamber 226 formed by the installation of bellows assembly 230 in an axle support structure or axle horn 221a of main housing 221. A portion of bellows member 232 and a portion of retention member 234 extend along a length of axle 224 and bellows member 232, in conjunction with a portion of axle horn 221a of main housing 221, isolates a volume of air within axle horn 221a to form air chamber 226. Sump 225 is sealed from air chamber 226 by seals 232a, 232b, 232c and 232d that are similar in form to o-rings integrally formed on bellows member 232, as shown. Seals 232a, 232b, 232c and 232d are static seals retained in grooves 221c and 221d formed in housing 221. Grooves 221c and 221d conform to the contours of axle horn 221a and extend completely around axle 224. The peripheral edges of flexible bellows member 232 (on which seals 232a, 232b, 232c and 232d are formed) wrap around mating edges of retention member 234 such that seals 232a and 232b are pushed into groove 221c formed in or near the more flared end of axle horn 221a while seals 232c and 232d are pushed into groove 221d formed in or nearer to the less flared end of axle horn 221a when retention member 234 is installed. Bellows member 232 can be pre-installed on retention member 234 so that these two components can be installed in housing 221 simultaneously. Retention member 234 is then secured to main housing 221 by a plurality of screws 236 or other suitable joining means, such as rivets, for example. Retention member 234 includes one or more oil flow openings 234a to allow oil to move freely in and out of the dynamic volume located between surfaces of retention member 234 and surfaces of flexible bellows member 232 in contact with the oil in sump 225 as the oil volume in sump 225 expands and contracts. Retention member 234 retains bellows member 232 and also prevents any damaging contact between bellows member 232 and any moving parts, such as gear 229. A drain opening 221b in communication with air chamber 226 is provided through an outer wall of main housing 221 to allow fluid drainage, partially relieve case pressure, and to detect failure or excessive seal leakage of bellows assembly 230. Because bellows assembly 230 does not incorporate either an integral or attached axle seal, and because bearing 228 is exposed to the oil of sump 225, bearing 228 need not be a sealed bearing, in which instance oil may pass around and/or through bearing 228 and an axle seal 233 is provided.

Figure 7:
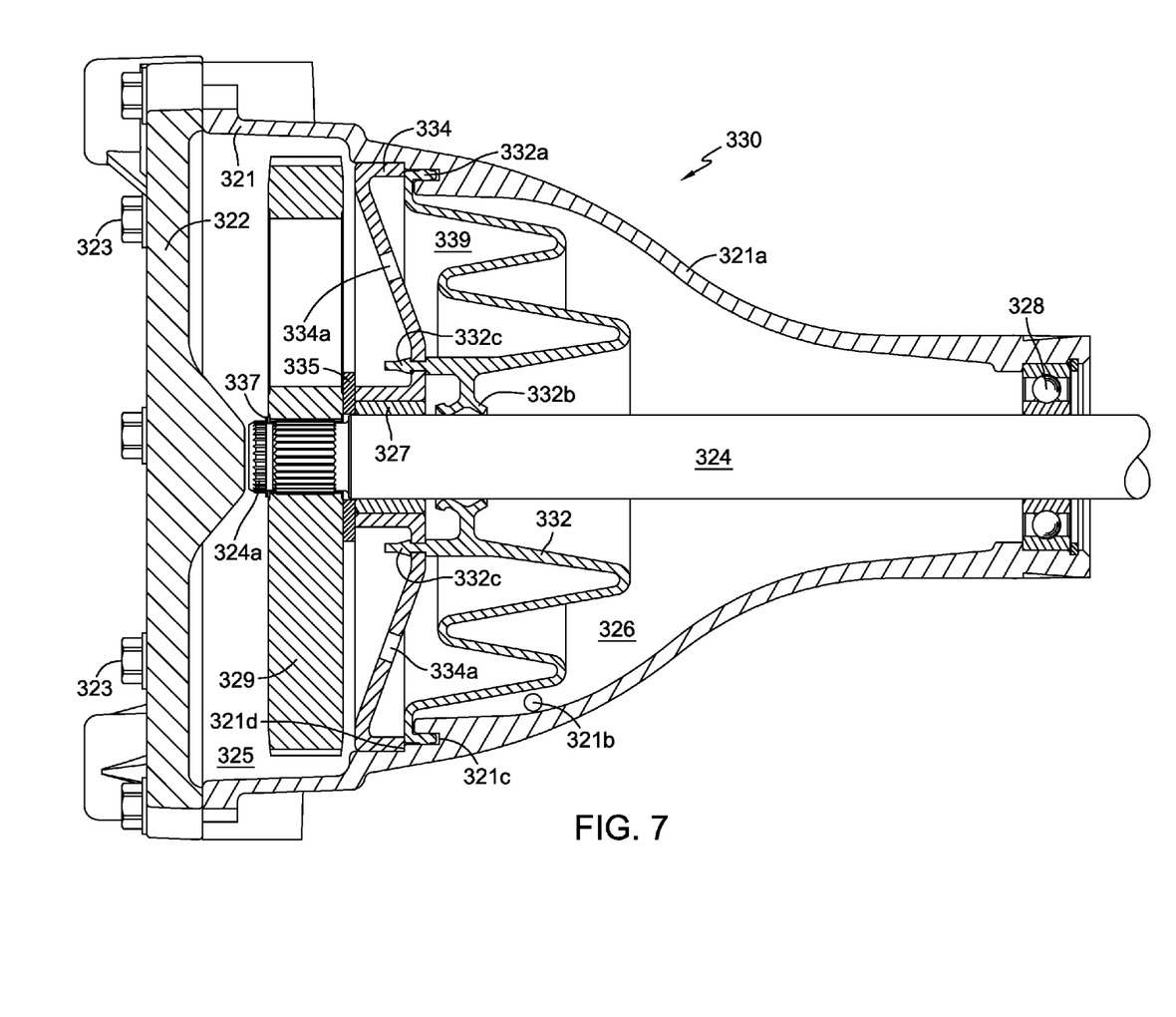
FIG. 7 is a cross-sectional view of another transaxle, similar to that shown in FIG. 2, depicting a fourth embodiment of the present invention.

A fourth embodiment of the present invention is illustrated in FIG. 7. A main housing 321 is joined by a plurality of fasteners 323 and joint sealant (not shown) or by other known means to side housing 322 along a split line generally perpendicular to output axle 324 to form a case comprising an oil sump 325, which is partitioned so that an air chamber 326 is created by the partitioning means in conjunction with a portion of the housing structure surrounding and supporting axle 324, and a scaled bearing 328. Axle shaft 324 is supported near one end by a bearing 327 mounted in bellows retention member 334 supported in main housing 321 and is supported nearer to its other end by the sealed bearing 328 mounted in main housing 321. Gear 329 is splined or otherwise rotatably fixed to and drives axle 324. Bellows assembly 330 includes a bellows member 332 that serves as a flexible partition separating sump 325 from air chamber 326 formed by the installation of bellows assembly 330 in axle horn 321a of main housing 321. Sump 325 is sealed from air chamber 326 by seals 332a and 332b that are integrally formed on bellows member 332, as shown, or otherwise attached or affixed thereto. Seal 332a is similar to an o-ring and is pushed into groove 321c formed in main housing 321 while seal 332b seals against axle 324.

Bellows member 332 is anchored to retention member 334 by a plurality of projections 332c integrally formed on bellows member 332, as shown, or by other known attachment means, in order to prevent any substantial axial movement of seal 332b. Bellows member 332 is retained by retention member 334 that is trapped in position between shoulder 321d formed in main housing 321 and a sequential grouping of components and component features comprising adjacent washer 335, year 329, retaining ring 337, axle end 324a and side housing 322. Retention member 334 includes one or more oil flow openings 334a to allow oil to move freely in and out of the dynamic volume 339 located between retention member 334 and the interior surfaces of flexible bellows member 332 in contact with the oil in sump 325 as the oil volume in sump 325 expands and contracts.

Retention member 334 also prevents any damaging contact between bellows member 332 and any moving parts, such as gear 329. A drain opening 321b in communication with air chamber 326 is provided through an outer wall of main housing 321 to allow fluid drainage, partially relieve case pressure, and to detect failure or excessive seal leakage of bellows assembly 330.

Figure 8:
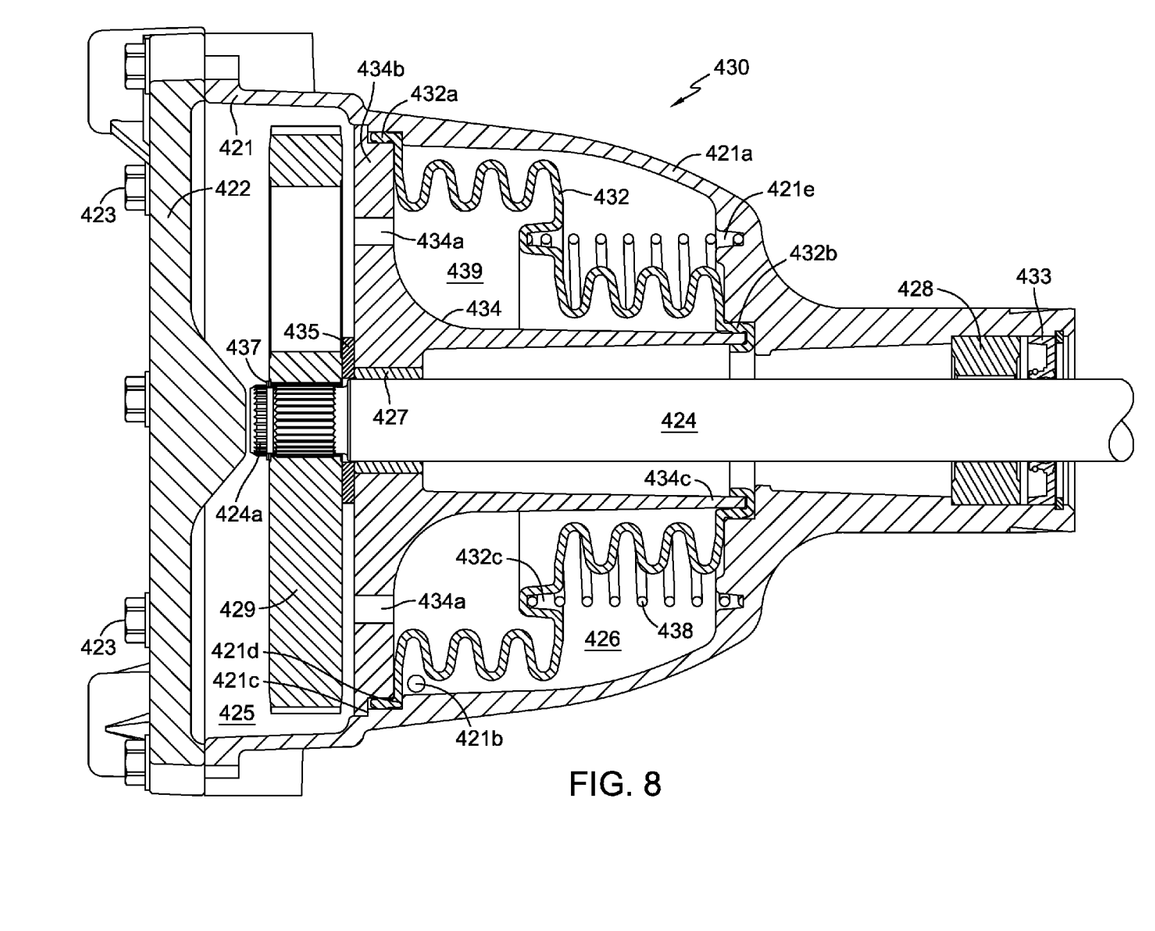
FIG. 8 is a cross-sectional view of a transaxle, similar to that shown in FIG. 7, depicting a fifth embodiment of the present invention.

Referring now to FIG. 8, a fifth embodiment of the present invention is illustrated. A main housing 421 is joined by a plurality of fasteners 423 and joint sealant (not shown) or by other known means to side housing 422 along a split line generally perpendicular to output axle 424 to form a case comprising an oil sump 425, which is partitioned so that an air chamber 426 is created by the partitioning means in conjunction with a portion of the housing structure surrounding and supporting axle 424. Axle shaft 424 is supported near one end by a bearing 427 mounted in bellows retention member 434 supported in main housing 421 and is supported nearer to its other end by bearing 428 mounted in main housing 421. Gear 429 is splined or otherwise rotatably fixed to and drives axle 424.

Bellows assembly 430 includes a bellows member 432 that serves as a flexible partition separating sump 425 from air chamber 426 formed by the installation of bellows assembly 430 in axle horn 421a of main housing 421. Bellows retention member 434 comprises a main body 434b extending around the circumference of axle 424 and disposed adjacent to gear 429, and an extension 434c extending along the longitudinal axis of axle 424 towards the distal end thereof. Sump 425 is sealed from air chamber 426 by boundary seals 432a and 432b that are both similar to o-rings and are integrally formed on bellows member 432, as shown, or otherwise attached or affixed thereto. When bellows retention member 434 and bellows member 432 are pushed into position during assembly into axle horn 421a, seal 432a is trapped and squeezed between bellows retention member 434 and main housing 421 at or near the more flared end of axle horn 421a while seal 432b is trapped and squeezed between bellows retention member 434 and main housing 421 at or near the less flared end of axle horn 421a. Thus, bellows member 432 is retained by bellows retention member 434 which itself is trapped in position between shoulder 421c formed in main housing 421 and a sequential grouping of components and component features comprising adjacent washer 435, gear 429, retaining ring 437, axle end 424a and side housing 422. A shoulder 421d formed in main housing 421 prevents seal 432a from working free from its sealing contact while a peripheral edge (on which seal 432b is formed) of bellows member 432 is wrapped around a mating edge of retention member 434 to prevent seal 432b from working free from its sealing contact.

A biasing member in the form of spring 438 provides support for the flexible bellows member 432 while the force applied by spring 438 against bellows member 432 provides a manufacturer pre-determined case oil pressure range. This spring-assisted case oil pressurization method can be used instead of a charge pump, provided the various case seals are appropriately rated. As is known, a charge pump is often used in various hydrostatic transaxle configurations to supply oil from the sump to the low pressure side of the transaxle's pump unit (not shown) via fluid passages protected by check valves (not shown). Increasing the case oil pressure outside those check valves by use of a biasing member in concert with the bellows assembly can eliminate the need for a charge pump. Channels or grooves 432c and 421e are formed in bellows member 432 and main housing 421, respectively, to maintain proper functional positioning of spring 438. Retention member 434 includes one or more oil flow openings 434a to allow oil to move freely in and out of the dynamic volume 439 located between retention member 434 and the interior surfaces of flexible bellows member 432 in contact with the oil in sump 425 as the oil volume in sump 425 expands and contracts.

Retention member 434 also prevents any damaging contact between bellows member 432 and any moving parts, such as gear 429. A drain opening 421b in communication with air chamber 426 is provided through an outer wall of main housing 421 to allow fluid drainage, partially relieve case pressure, and to detect failure or excessive seal leakage of bellows assembly 430. Because bellows assembly 430 does not incorporate either an integral or attached axle seal, and because axle bearing 428 is exposed to the oil of sump 425 for the purpose of lubrication and because oil can pass around and/or through axle bearing 428, an axle seal 433 is provided.

Figure 9:
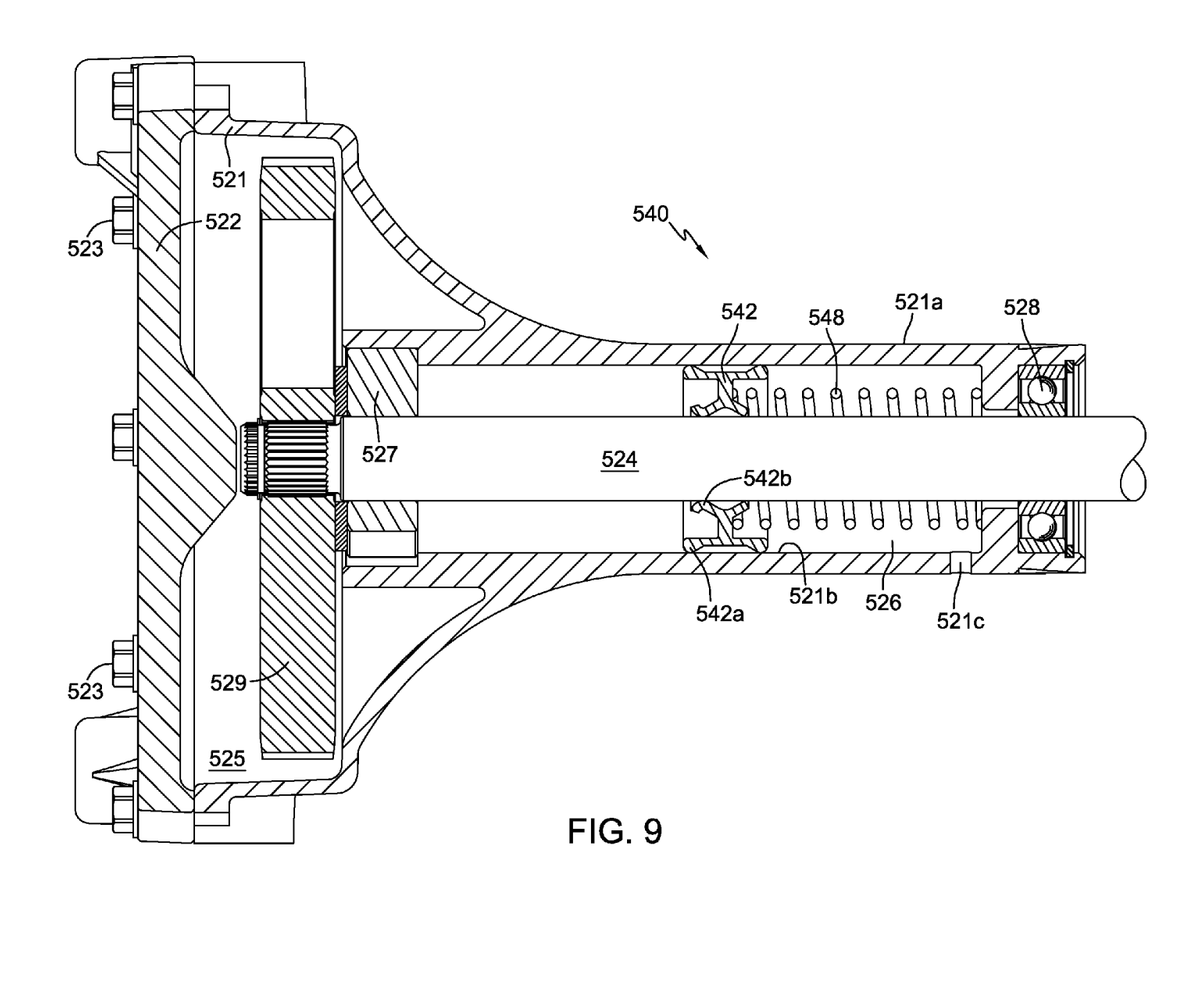
FIG. 9 is a cross-sectional view of another transaxle, similar to that shown in FIG. 7, depicting a sixth embodiment of the present invention.

A sixth embodiment of the present invention is illustrated in FIG. 9. A main housing 521 is joined by a plurality of fasteners 523 and joint sealant (not shown) or by other known means to side housing 522 along a split line generally perpendicular to output axle 524 to form a case comprising an oil sump 525. A fluid volume expansion and contraction accommodation apparatus in the form of piston assembly 540 includes a piston 542 that serves as a moving partition separating sump 525 from an air chamber 526 that is formed by a group of elements comprising piston 542, a portion of the main housing 521 axle support structure 521a surrounding and supporting axle 524, and a sealed bearing 528. Axle shaft 524 is supported near one end by a bearing 527 mounted in main housing 521 and is supported nearer to its other end by the sealed bearing 528, which is also mounted in main housing 521. Gear 529 is splined or otherwise rotatably fixed to and drives axle 524. Sump 525 is sealed from air chamber 526 by seals 542a and 542b that are integrally formed on piston 542, as shown, or otherwise attached or affixed thereto. Seal 542a seals against the surface of a bore 521b formed in main housing 521 while seal 542b seals against axle 524. Piston 542, along with its associated dynamic seals 542a and 542b, moves axially in each direction along axle 524 as oil in sump 525 expands and contracts due to temperature changes and resultant volume changes.

A biasing member in the form of spring 548 applies force against piston 542 to provide a manufacturer pre-determined case oil pressure range. As described for the fifth embodiment, this spring-assisted case oil pressurization method can be used in lieu of a charge pump.

A drain opening 521c in communication with air chamber 526 is provided through an outer wall of main housing 521 to allow fluid drainage, partially relieve case pressure, and to detect failure or excessive seal leakage of piston assembly 540.

While specific configurations of the invention have been described in detail, it will be appreciated by those skilled in the art that various modifications and alternatives to those details could be developed in light of the overall teachings of the disclosure.

The particular arrangements disclosed herein are meant to be illustrative only and not limiting as to the scope of the invention which is to be given the full breadth of the appended claims and any equivalents thereof.

The invention claimed is:

1. A hydraulic drive apparatus, comprising:
a housing forming a sump containing hydraulic fluid;
an axle support structure connected to the housing and at least partially supporting an axle having a longitudinal axis of rotation;
a fluid volume accommodation apparatus mounted and contained within the axle support structure, the fluid volume accommodation apparatus comprising a partitioning element separating the hydraulic fluid from an air chamber created at least partially by the partitioning element; and
wherein the partitioning element extends completely around a portion of the axle and at least a portion of the partitioning element is movable along the longitudinal axis of the axle to expand the volume of the sump.

2. The hydraulic drive apparatus of claim 1, wherein the partitioning element is a bellows member.

3. The hydraulic drive apparatus of claim 2, further comprising a bellows retention member and the bellows member is at least partially supported by the bellows retention member.

4. The hydraulic drive apparatus of claim 3, wherein the bellows member comprises a static seal and a dynamic seal.

5. The hydraulic drive apparatus of claim 4, wherein the bellows member is attached to the bellows retention member so that the dynamic seal is restrained from movement in either axial direction when the hydraulic fluid in the sump expands or contracts.

6. The hydraulic drive apparatus of claim 4, wherein the static seal interfaces with the axle support structure and the dynamic seal interfaces with the axle, and the dynamic seal moves in one axial direction when the hydraulic fluid in the sump expands and in the opposite axial direction when the hydraulic fluid in the sump contracts.

7. The hydraulic drive apparatus of claim 2, wherein the bellows member comprises at least two static seals, and the static seals form boundaries of the air chamber in cooperation with the axle support structure.

8. The hydraulic drive apparatus of claim 3, wherein the bellows retention member directly supports an axle bearing.

9. The hydraulic drive apparatus of claim 2, further comprising a biasing member interposed between the axle support structure and the bellows member.

10. The hydraulic drive apparatus of claim 9, wherein the bellows member is at least partially supported by the biasing member.

11. The hydraulic drive apparatus of claim 1, wherein the partitioning element comprises a piston movable along the longitudinal axis of the axle.

12. The hydraulic drive apparatus of claim 11, further comprising a biasing member interposed between the axle support structure and the piston.

13. The hydraulic drive apparatus of claim 1, further comprising a drain opening connecting the air chamber to atmosphere.

14. The hydraulic drive apparatus of claim 1, wherein the axle support structure comprises an axle horn integrally formed with the housing.

15. A axle driving device, comprising:
a housing forming a hydraulic sump and having an axle portion;
a hydrostatic transmission disposed in the housing and driving a gear mechanism;
an axle partially disposed in the axle portion of the housing and having a longitudinal axis of rotation, a proximal end driven by the gear mechanism and a distal end disposed outside the axle portion of the housing; and
an expandable bellows disposed adjacent the proximal end of the axle and forming a barrier between the hydraulic sump and an air chamber defined by interior walls of the axle portion of the housing and a surface of the expandable bellows, wherein a portion of the expandable bellows is moveable along the longitudinal axis of the axle toward the distal end to increase the size of the hydraulic sump.

16. The axle driving device of claim 15, wherein the expandable bellows has an annular shape with an outer diameter engaged to an interior wall of the housing and an inner diameter engaged to the axle.

17. The axle driving device of claim 16, further comprising a dynamic seal located at the inner diameter.

18. The axle driving device of claim 15, further comprising a spring disposed between an interior surface of the axle portion of the housing and the expandable bellows.

19. The axle driving device of claim 15, further comprising a retention member securing the expandable bellows to the housing.

20. The axle driving device of claim 19, wherein the retention member secures an outer diameter of the expandable bellows to an interior wall of the housing.

21. The axle driving device of claim 20, wherein the expandable bellows has an annular shape with the outer diameter engaged to the interior wall of the housing and an inner diameter engaged to the axle, and the expandable bellows is engaged to the retention member at a second point to prevent the inner diameter of the expendable bellows from moving with respect to the axle.

22. A axle driving device, comprising:
a housing forming a hydraulic sump and having an axle portion;
a hydrostatic transmission disposed in the housing and driving a gear mechanism;
an axle partially disposed in the housing and having a proximal end driven by the gear mechanism and a distal end disposed outside the axle portion of the housing; and
a piston disposed along the axle and forming a barrier between the hydraulic sump and an air chamber defined by interior walls of the axle portion of the housing and a surface of the piston, wherein the piston moves toward the distal end of the axle as pressure in the hydraulic sump increases to increase the size of the hydraulic sump.

23. The axle driving device of claim 22, further comprising a spring disposed between an interior surface of the axle the housing and the piston, to bias the piston to a position away from the distal end of the axle.

* * * * *

UNITED STATES PATENT AND TRADEMARK OFFICE
CERTIFICATE OF CORRECTION

Page 1 of 1

PATENT NO. : 8,931,268 B1
APPLICATION NO. : 13/336214
DATED : January 13, 2015
INVENTOR(S) : Thomas J. Langenfeld It is certified that error appears in the above-identified patent and that said Letters Patent is hereby corrected as shown below:

In the Specification,

Column 3, line 15, "228" should be changed to --28--.
Column 3, line 55, "supposed" should be changed to --supported--.
Column 6, line 12, "scaled" should be changed to --sealed--.
Column 6, line 35, "year" should be changed to --gear--.

In the Claims,

Column 10, line 21, "expendable" should be changed to --expandable--.

Signed and Sealed this
Twenty-sixth Day of May, 2015

Michelle K. Lee
*Director of the United States Patent and Trademark Office*